United States Patent
Khmelev et al.

(10) Patent No.: US 12,182,846 B1
(45) Date of Patent: Dec. 31, 2024

(54) ORDER FULFILLMENT MANAGEMENT SYSTEM AND METHOD

(71) Applicant: United Services Automobile Association (USAA), San Antonio, TX (US)

(72) Inventors: Yevgeniy Viatcheslavovich Khmelev, San Antonio, TX (US); Zachery C. Lake, Aubrey, TX (US); Will Kerns Maney, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 17/485,759

(22) Filed: Sep. 27, 2021

Related U.S. Application Data (60) Provisional application No. 63/084,227, filed on Sep. 28, 2020.

(51) Int. Cl.
    *G06Q 30/0601* (2023.01)
    *G06Q 10/087* (2023.01)
    (Continued)

(52) U.S. Cl.
    CPC ....... *G06Q 30/0631* (2013.01); *G06Q 20/108* (2013.01); *G06Q 30/0215* (2013.01);
    (Continued)

(58) Field of Classification Search
    CPC ............. G06Q 30/0631; G06Q 20/108; G06Q 30/0215; G06Q 30/0222; G06Q 30/0633;
    (Continued)

(56) References Cited

U.S. PATENT DOCUMENTS

| 5,878,401 | A  | * | 3/1999 | Joseph | G06Q 10/087 |
| | | | | | 705/26.62 |
| 7,054,832 | B1 | * | 5/2006 | Vallabh | G06Q 30/0633 |
| | | | | | 705/26.8 |

(Continued)

FOREIGN PATENT DOCUMENTS

CA  2297787 A1 * 2/2006 ............. G06Q 30/00

OTHER PUBLICATIONS

Diels et al, "The Impact of Promotions on Consumer Choices and Preferences in Out-of-Sotck Situations", Journal of Retailing and Consumer Services, vol. 20, Issue 6, Nov. 2013, pp. 587-598. (Year: 2013).*

*Primary Examiner* — Marie P Brady
(74) *Attorney, Agent, or Firm* — Fletcher Yoder, P.C.

(57) ABSTRACT

An order fulfillment management system includes processing circuitry configured to receive merchant data indicative of a capability of a merchant to fulfill orders for a good. The processing circuitry is also configured to provide an output to a first consumer in response to the first consumer attempting to complete a purchase of the good from the merchant while the merchant data indicates that the merchant is unable to fulfill the orders for the good within a timeframe. The output includes a notification on a graphical user interface for visualization by the first consumer, and the notification is configured to discourage the first consumer from purchasing the good from the merchant by recommending an alternative action to the first consumer.

18 Claims, 2 Drawing Sheets

(51) Int. Cl.
*G06Q 20/10* (2012.01)
*G06Q 30/0207* (2023.01)
*G06Q 40/02* (2023.01)

(52) U.S. Cl.
CPC ..... *G06Q 30/0222* (2013.01); *G06Q 30/0633* (2013.01); *G06Q 30/0639* (2013.01); *G06Q 40/02* (2013.01); *G06Q 10/087* (2013.01)

(58) Field of Classification Search
CPC ... G06Q 30/0639; G06Q 40/02; G06Q 10/087
See application file for complete search history.

(56) References Cited

U.S. PATENT DOCUMENTS

| | | | | |
|---|---|---|---|---|
| 10,679,268 | B1* | 6/2020 | Kochhar | G06Q 30/0613 |
| 10,915,915 | B1* | 2/2021 | Lieberman | G06Q 20/387 |
| 2002/0072980 | A1* | 6/2002 | Dutta | G06Q 30/0633 |
| | | | | 705/26.8 |
| 2003/0061094 | A1* | 3/2003 | Banerjee | G07F 9/002 |
| | | | | 705/14.24 |
| 2005/0149414 | A1* | 7/2005 | Schrodt | G06Q 10/087 |
| | | | | 705/29 |
| 2007/0050069 | A1* | 3/2007 | Treichler | G06Q 10/087 |
| | | | | 700/99 |
| 2008/0249658 | A1* | 10/2008 | Walker | G07F 9/02 |
| | | | | 700/232 |
| 2008/0275817 | A1* | 11/2008 | Scipioni | G06Q 30/06 |
| | | | | 705/42 |
| 2010/0241501 | A1* | 9/2010 | Marshall | G06Q 30/0224 |
| | | | | 705/14.23 |
| 2011/0016014 | A1* | 1/2011 | Tonnison | G06Q 30/02 |
| | | | | 705/14.51 |
| 2011/0055413 | A1* | 3/2011 | Lobsenz | G06Q 10/06 |
| | | | | 709/224 |
| 2011/0137794 | A1* | 6/2011 | Ferrari | G06Q 40/02 |
| | | | | 705/42 |
| 2014/0012744 | A1* | 1/2014 | Hanson | G06Q 20/102 |
| | | | | 705/40 |
| 2014/0136366 | A1* | 5/2014 | Carroll | G06Q 30/0633 |
| | | | | 705/26.8 |
| 2014/0188601 | A1* | 7/2014 | Buset | G06Q 30/0633 |
| | | | | 705/26.7 |
| 2015/0100416 | A1* | 4/2015 | Blackhurst | G06Q 30/0253 |
| | | | | 705/14.51 |
| 2015/0348155 | A1* | 12/2015 | DuBois | G06Q 30/0603 |
| | | | | 705/14.51 |
| 2015/0379601 | A1* | 12/2015 | Ouimet | G06Q 30/0613 |
| | | | | 705/26.41 |
| 2017/0091823 | A1* | 3/2017 | Adinarayan | H04W 4/029 |
| 2017/0103435 | A1* | 4/2017 | Saia | G06Q 30/0601 |
| 2017/0169513 | A1* | 6/2017 | Perelman | G06Q 40/06 |
| 2020/0051011 | A1* | 2/2020 | Dasari | H04L 9/3239 |
| 2020/0334705 | A1* | 10/2020 | Benkreira | H04L 63/1433 |

\* cited by examiner

ORDER FULFILLMENT MANAGEMENT SYSTEM AND METHOD

CROSS-REFERENCE TO RELATED APPLICATION

This application claims priority to and the benefit of U.S. Provisional Application No. 63/084,227, entitled "ORDER FULFILLMENT MANAGEMENT SYSTEM AND METHOD," filed Sep. 28, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Consumers may order various goods, such as household goods, food and drink items, clothing, sports gear, or the like, from a merchant (e.g., retailer; business). Generally, the merchant may manage their inventory and shipping processes to fulfill orders made by the consumers in a timely manner. Thus, consumers may be accustomed to placing an order for a good and then receiving the good within a time period after placing the order, and the consumers may be disappointed if the good is not received within the time period after placing the order.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, an order fulfillment management system includes processing circuitry configured to receive merchant data indicative of a capability of a merchant to fulfill orders for a good. The processing circuitry is also configured to provide an output to a first consumer in response to the first consumer attempting to complete a purchase of the good from the merchant while the merchant data indicates that the merchant is unable to fulfill the orders for the good within a timeframe. The output includes a notification on a graphical user interface for visualization by the first consumer, and the notification is configured to discourage the first consumer from purchasing the good from the merchant by recommending an alternative action to the first consumer.

In one embodiment, an order fulfillment management system includes processing circuitry configured to receive merchant data indicative of a capability of a merchant to fulfill orders for a good. The processing circuitry is also configured to receive consumer data related to a consumer and to output a personalized notification to a consumer device of the consumer in response to the consumer attempting to complete a purchase of the good from the merchant while the merchant data indicates that the merchant is unable to fulfill the orders for the good within a timeframe. The personalized notification is based on the consumer data and is configured to discourage the consumer from completing the purchase of the good from the merchant by recommending an alternative action to the consumer.

In one embodiment, a method of operating an order fulfillment management system includes receiving, at processing circuitry, merchant data that indicates that a merchant is unable to fulfill orders for a good within a timeframe. The method also includes receiving, at the processing circuitry, consumer data related to a consumer. The method also includes receiving, at the processing circuitry, a request from the consumer to complete a purchase of the good from the merchant while the merchant data indicates that the merchant is unable to fulfill the orders for the good within the timeframe. The method also includes determining, using the processing circuitry, a recommended action for the consumer, wherein the recommended action is an alternative to the purchase of the good from the merchant and is based on the consumer data. The method further includes outputting, using the processing circuitry, a notification of the recommended action to a consumer device of the consumer to discourage the consumer from completing the purchase of the good from the merchant.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

It is presently recognized that it may be advantageous to provide an order fulfillment management system that is configured to monitor a merchant's ability to fulfill orders for goods and to provide an output (e.g., a notification, such as a text message) to one or more consumers based on the merchant's ability to fulfill orders for goods. In particular, the order fulfillment management system may monitor merchant factors, such as inventory data, shipping data, and/or order data. The order fulfillment management system may determine the merchant's ability to fulfill orders for goods based on the merchant factors. The order fulfillment management system may enable (e.g., trigger, activate) the output in response to the order fulfillment management system determining that the merchant is unable to fulfill orders for the goods (e.g., is likely to be unable to fulfill orders for the goods; has low inventory below an inventory threshold, has shipping delays, is experiencing a sudden increase in orders). The merchant may be considered to be unable to fulfill the orders for the goods when the merchant is unable to ship the goods from the merchant within a particular timeframe (e.g., time period) and/or to deliver the goods to the one or more consumer within a particular timeframe (e.g., time period).

The output may include a notification that discourages the one or more consumers from placing orders for goods from the merchant by notifying the one or more consumers that they will receive a financial incentive if they delay the order for the goods and/or by recommending that the one or more consumers take another action (e.g., contribute money to their savings account) instead of placing the order for the goods, for example. In some embodiments, the order fulfillment management system may block the output in response to the order fulfillment management system determining that the merchant is able to fulfill orders for the goods (e.g., is likely able to fulfill orders for the goods; has high inventory over the inventory threshold, has no shipping delays, is experiencing a usual rate of orders).

In some embodiments, the order fulfillment management system may also monitor consumer factors, such as financial data for the one or more consumers. The order fulfillment management system may use the consumer factors to determine and to provide the output as a targeted output that is specific to (e.g., personalized for; appropriate for; unique for) each consumer. For example, the output may advise the consumer that they have not contributed to their savings account during a current month and that it is recommended that the consumer make a contribution to their savings account during the current month instead of completing the order to purchase goods from the merchant.

In this way, the order fulfillment management system may assist merchants by adjusting a number of orders received by the merchant, such as by discouraging orders when the merchant experiences low inventory and/or a reduction in the number of goods that can be timely shipped by the merchant (e.g., due to low staffing and/or machinery maintenance), for example. The merchant may benefit by receiving orders that they are able to process in a timely manner and/or by maintaining customer satisfaction (e.g., meeting the consumers' expectations for delivery within the time period). Furthermore, the one or more consumers may benefit by using their money in other ways (e.g., contributing to their savings account) and/or by ordering when the goods can be delivered within the time period.

In some embodiments, the order fulfillment management system may be managed and/or operated by the merchant. In some embodiments, the order fulfillment management system may be managed and/or operated by an entity other than the merchant, such as by a third-party entity. For example, the order fulfillment management system may be managed and/or operated by a financial services entity (e.g., business) that provides financial services for consumers that may order goods from the merchant. The financial services entity may provide bank accounts (e.g., savings accounts, checking accounts), investment accounts (e.g., individual retirement accounts (IRAs)), payment cards (e.g., credit cards), loans (e.g., mortgage loans, vehicle loans, personal loans), and/or any of a variety of other financial services to the consumers. In such cases, the financial services entity may receive the merchant data from the merchant, and the financial services entity may access the consumer data (e.g., from one or more databases) to enable the financial services entity to provide the output (which may be the targeted output) for the consumer.

Figure 1:
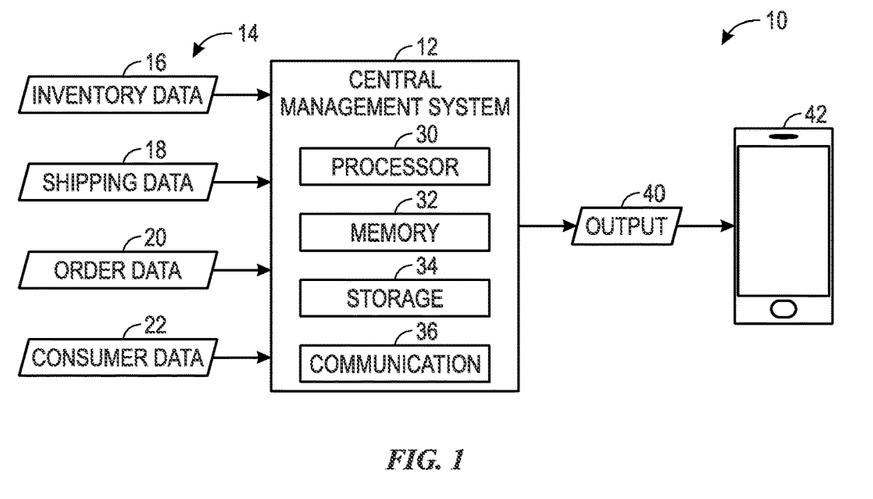
FIG. 1 is a schematic diagram of an order fulfillment management system, in accordance with an embodiment of the present disclosure.

With the foregoing in mind, FIG. 1 is a schematic diagram of an order fulfillment management system 10 (e.g., order tracking and guidance system), in accordance with an embodiment of the present disclosure. The order fulfillment management system 10 may be configured to monitor a merchant's ability to fulfill orders for goods and to provide an output (e.g., text message) to one or more consumers based on the merchant's ability to fulfill orders for goods. As shown, the order fulfillment management system 10 may include a central management system 12 that intakes merchant data 14, such as inventory data 16, shipping data 18, and/or order data 20. The inventory data 16 may include a current inventory of each good sold by the merchant and/or an upcoming resupply of each good sold by the merchant (e.g., based on supply chain data, such as scheduled deliveries from a manufacturer to the merchant). In some embodiments, the inventory data 16 may include location data, such as a physical location of a retail store of the merchant that has the good in stock.

The shipping data 18 may include a current shipping rate of each good and/or all goods sold by the merchant (e.g., over a prior time period, such as over the prior 24 hours) and/or an expected shipping rate of each good and/or all goods sold by the merchant (e.g., over a future time period, such as over the next 24 hours). The shipping rate may indicate the ability of the merchant to ship out and to fulfill orders in a timely manner. However, the shipping rate may change based on various factors, such as staffing at the merchant and/or machinery maintenance. Thus, the shipping rate may vary over time in either a scheduled manner or in an unplanned manner. The shipping data 18 may also include a shipping time for each good and/or all goods sold by the merchant (e.g., a median and/or an average time between being shipped by the merchant and receipt by the consumer over the prior time period) and/or an expected shipping time of each good and/or all goods sold by the merchant (e.g., over the future time period). The shipping time may change based on various factors, such as natural disasters that affect the ability of a shipping service to transport the goods and/or staffing at the shipping service. Thus, the shipping time may vary over time in either a scheduled manner or in an unplanned manner. Even though the shipping time may not be controlled by the merchant, a delay in the shipping time may influence or negatively affect the consumer's view of the merchant because the goods may not arrive within the time period expected by the consumer and/or may otherwise provide a valid reason to delay the order by the consumer (e.g., for the consumer to use the money in other ways).

The order data 20 may include outstanding (e.g., unfulfilled) orders for each good sold by the merchant. The order data 20 may also include a current order rate of each good and/or all goods sold by the merchant (e.g., over the prior time period) and/or an expected order rate of each good and/or all goods sold by the merchant (e.g., over the future time period). While the merchant may provide some or the all of the merchant data 14 to the central management system 12, it should be appreciated that in some embodiments the central management system 12 may be configured to receive only some of the merchant data 14 (e.g., the current inventory) from the merchant and may be configured to determine or estimate other merchant data 14 (e.g., the current order rate, the expected order rate).

In some embodiments, the central management system 12 may intake consumer data 22. The consumer data 22 may include financial information (e.g., bank account numbers and balances; investment account numbers and balances; prior deposits and/or withdrawals from such accounts; payment amounts and due dates for payment cards, loans, bills, or the like) for one or more consumers that may order goods from the merchant. In some embodiments, the consumer data 22 may include historical order data, such as a last time that the consumer ordered the goods from the merchant or from another source. In some such cases, the historical order data may be determined via data mining (e.g., searching for keywords in financial records, such as bank statements) and/or via the merchant (e.g., transaction history). It should be appreciated that the merchant data 14 and the consumer data 22 may be received from any of a variety of data sources, such as the merchant, shipping services, financial services provider, and/or from other suitable source, and/or may be determined by the central management system 12.

The central management system 12 may include a processor 30, a memory device 32, a storage device 34, a communication device 36, and/or any other suitable components to carry out the techniques disclosed herein. In some embodiments, the central management system 12 may be configured to store data (e.g., the merchant data 14, the consumer data 22) in and/or access the data from one or more databases, which may be considered to be part of the central management system 12 (e.g., in the memory device 32 and/or the storage device 34) or communicatively coupled to the central management system 12. It should be appreciated that the central management system 12 may include a distributed control system having multiple processors 30 and associated components.

As noted above, the central management system 12 may be configured to monitor the merchant's ability to fulfill orders for a wide variety of goods. The central management system 12 may receive and analyze the inventory data 16, the shipping data 18, and the order data 20 to determine the merchant's ability to fulfill orders for each good sold by the merchant. For example, if the inventory data 16 indicates that the inventory for the good is over an inventory threshold, the shipping data 18 indicates that there are no delays with respect to shipping (either internally at the merchant and/or due to the shipping service; the shipping rate is within a shipping rate threshold and/or the shipping time is within a shipping time threshold), and the order data 20 indicates the number of outstanding orders for the good is less than the inventory and/or a generally steady rate of orders for the good over a prior time period (e.g., within an order threshold and/or an order rate threshold), then the central management system 12 may determine that the merchant is likely to be able to fulfill orders in a timely manner and may not provide the output 40 to the consumer. However, if the inventory data 16 indicates that the inventory for the good is under the inventory threshold, the shipping data 18 indicates that there are delays with respect to shipping (e.g., exceeds the shipping rate threshold and/or the shipping time threshold), and/or the order data 20 indicates the number of outstanding orders for the good is greater than the inventory and/or an increasing rate of orders for the good is expected over the future time period (e.g., exceeds the order threshold and/or the order rate threshold), then the central management system 12 may determine that the merchant is unlikely to be able to fulfill any more orders for the good in a timely manner, and in response or as a result, may provide the output 40 to the consumer.

In some embodiments, increasing orders and/or unusually high orders for a first type of good may result in the central management system 12 determining that the merchant is unlikely to be able to fulfill orders for a second type of good. In such cases, the merchant may provide an indication of a preference or priority for the goods sold by the merchant (e.g., the merchant may prioritize the first type of good, such as items with higher profit margins, food items or other necessities, or the like). For example, even if the inventory data 16 indicates that there is sufficient inventory of the first type of good (e.g., food items) and the second type of good (e.g., laptop computers), the central management system 12 may determine that the merchant is unlikely to be able to fulfill the orders for the second type of good due to unusually high orders of the first type of good and resulting limitations on the shipping rate for the merchant, as well as the merchant's priority given to the first type of good. Then, if the consumer attempts to order the second type of good with the lower priority, the central management system 12 may provide the output 40 to the consumer. However, if the consumer attempts to order the first type of good with the higher priority, the central management system 12 may not provide the output 40 to the consumer. In this way, the central management system 12 may discourage the consumer from placing orders in a way that is in line with defined priorities (e.g., established by the merchant).

Once the central management system 12 determines that the merchant is unlikely to be able to fulfill any more orders for the good in a timely manner, the central management system 12 may provide the output 40, such as to a personal device 42 (e.g., mobile phone, personal computer) of the consumer. In such cases, the output 40 may include a text message, a map with directional guidance (e.g., to a physical location of a retail store), and/or an informative graphic (e.g., chart) on a graphical user interface (GUI) that may be visualized by the consumer. The output 40 may be configured to generally discourage the consumer from placing the order for the good, at least at the present time. The output 40 may be provided to the consumer in response to the consumer attempting to place the order for the good from the merchant. For example, as the consumer attempts to place the order for the good from the merchant using a webpage for the merchant's online store, the output 40 may be provided as a pop-up notification over the webpage. However, the output 40 may be provided at other times and/or in another ways, such as on the webpage above or below a virtual button that the consumer would select to place the order (e.g., integrated into the webpage).

The output 40 may be the same for all consumers that attempt to order the good from the merchant while the merchant is unlikely to be able to fulfill the orders for the good. For example, the output 40 may request that the consumer delay purchase to a particular date (e.g., when the good will be restocked; when fulfillment can be completed without delay and/or without strain on the merchant), the output 40 may indicate that the merchant will offer a discount on the good or another financial incentive to any consumer that delays purchase until the particular date, that a financial services company (e.g., separate from the merchant; the entity that manages the central management system 12) will offer a financial incentive to any consumer that delays purchase until the particular date (e.g., increased cash back for payment made with a payment card after the particular date; cash contribution to the consumer's account, such as an individual retirement account). In some embodiments, a discount from the merchant may be combined with a financial incentive from the financial services company (e.g., the merchant may provide a discount, and the amount saved due to the discount is automatically transferred to the consumer's account, such as an individual retirement account, upon purchase of the good after the particular date).

In some embodiments, multiple different discounts from the merchant and/or multiple different financial incentives from the financial services company may be presented to the consumer, and the consumer may be able to make a selection of their preferred option. Alternatively, the consumer may establish a profile to pre-select their preferred option during a registration process so that their preferred option is presented to them (only their preferred option is presented to them or is highlighted/prominently presented to them) during future attempts to purchase goods from the merchant.

It should also be appreciated that different merchants may provide the same or different discounts. For example, the central management system 12 may present an offer of a discount on a future purchase of the good following an attempt to order the good from one merchant, while the central management system 12 may present an offer of a coupon to be used on any future purchase following an attempt to order the good from another merchant. Indeed, the different merchants may set or input their preferred offers into the central management system 12. Similarly, the financial services company may offer the same or different financial incentives, such as the same or different financial incentives for attempted purchases at different stores or for different types of goods. For example, the central management system 12 may present an offer of an additional deposit into the consumer's bank account following the attempt to order the good from one merchant, while the central management system 12 may present an offer of a decreased interest rate following the attempt to order the good from another merchant. Indeed, the different merchants may set or input their preferred the financial incentives (e.g., that the merchant would like to be offered to their consumers by the financial services company).

In some embodiments, the central management system 12 may utilize the consumer data 22 to provide a targeted, and in some cases unique, output 40 to the consumer. For example, the output 40 may suggest that the consumer delay the order and instead take another action, such as putting additional money into the consumer's savings account. In some such cases, the output 40 may include an indication of the last time that the consumer contributed to their savings account, an amount of money in their savings account, and/or other information related to their savings account. Similarly, the output 40 may suggest that the consumer delay the order and instead put additional money toward payment of debt, such as payment card debt, student loan debt, or the like. In some such cases, the output 40 may include an indication of a due date for a payment of the debt, an amount of the debt, and/or other information related to the debt. The output 40 may suggest that the consumer delay the order and instead use the money to pay an upcoming bill. In some such cases, the output 40 may include an indication of an amount of the upcoming bill, the due date for the upcoming bill, and/or an amount of available funds in the consumer's bank account(s). The output 40 may suggest that the consumer delay the order (and delay payment of a full cost of the good) by instead making or establishing periodic payments from an account (e.g., bank account, payment card account) of the first consumer, such that the periodic payments allow for a completed purchase of the good at a later time (e.g., upon completion of the periodic payments, which together provide the full cost of the good to the merchant). In some such cases, the output 40 may provide an amount of available funds in the consumer's account (e.g., account balance; remaining credit), upcoming bills, or other financial information. The output 40 may facilitate establishing the periodic payments from the account, such as by including a link that takes the consumer to a fillable form or other webpage to set up the periodic payments (e.g., automatic payments; withdrawn automatically on a schedule). In some embodiments, the output 40 may include an indication of a date on which the consumer last purchased the good and/or an indication of a typical frequency with which the consumer buys the good and/or other information related to the prior purchase(s) of the good.

In any case, the output 40 may include information to discourage the order by the consumer, such as by providing a financial incentive (e.g., discount or cash back for delay) and/or by providing a recommendation for an alternate action or use of the money that would have been used to pay for the order, for example. It should be appreciated that the central management system 12 may be configured to provide multiple different types of outputs 40 to the consumer, such as the output 40 to the consumer to discourage the consumer from placing the order with the merchant while the data indicates that the merchant is unlikely to be able to fulfill the order and/or an additional output to the consumer to encourage the consumer to place the order with the merchant while the data indicates that the merchant is likely to be able to fulfill the order. For example, the additional output may include various text messages, such as text messages that indicate the good is in stock, the good is expected to arrive on time, a status of an account of the consumer (e.g., the consumer does not have outstanding debt on a payment card, the consumer has paid their bills for a current month, and/or a checking account of the consumer has a balance that is above average for a particular time of the current month), or the like.

In some embodiments, the output 40 may vary based on a severity and/or a degree with which the merchant is unable to fulfill the orders (e.g., a corresponding severity level). For example, if the severity is a first level (e.g., minor; a level 1 on a scale of 1 to 10, where 1 is only a small portion of orders are delayed and 10 is all orders are delayed), then the output 40 may recommend that the consumer delay the order for a first time period (e.g., 24 hours) and provide a first incentive (e.g., a one percent discount or cash back). However, if the severity is a second level (e.g., major; a level 10 on the scale of 1 to 10), then the output 40 may recommend that the consumer delay the order for a second time period (e.g., 1 week) that is longer than the first time period and provide a second incentive (e.g., a five percent discount or cash back). In some such cases, the output 40 may also recommend an alternate action or use for the money, as the money will not be needed to purchase the good from the merchant for some time. Indeed, the content of the output 40 (e.g., time of delay and/or incentive and/or alternate action) may vary on a sliding scale with the severity and/or the degree with which the merchant is unable to fulfill the orders.

Furthermore, the central management system 12 may adjust the number of consumers to which it delivers the output 40 based on the severity and/or the degree with which the merchant is unable to fulfill the orders. For example, if the severity is the first level, the central management system 12 may provide the output 40 to discourage the order to a first percentage of consumers (e.g., approximately equal to or less than 5, 10, 15, 20, 25, or 50 percent of consumers that attempt to place the order; every second, third, fourth, fifth, or tenth consumer that attempts to place the order). However, if the severity is the second level, the central management system 12 may provide the output to discourage the order to a second percentage of consumers (e.g., approximately equal to or greater than 50, 55, 60, or 90 percent of consumers that attempt to place the order; every second consumer; all consumers). Indeed, the percentage of consumers that receive the output 40 may vary on a sliding scale with the severity and/or the degree with which the merchant is unable to fulfill the orders. In some embodiments, the merchant may provide an input of preference and/or priority to be given to consumers, such as priority to consumers that pay a membership fee to the merchant, priority based on a spending average over a time period (e.g., over the prior year), priority based on a total dollar amount of a current purchase (e.g., multiple items that include the good), or the like. Then, the central management system 12 may disable the output 40 for the consumers that have the priority and may enable the output 40 for the consumers that do not have the priority. The central management system 12 may provide different financial incentives based on the priority (e.g., better financial incentives for consumers with higher priority). In some embodiments, the central management system 12 may select the consumers that receive the output 40 based on the consumer data 22. For example, the central management system 12 may select and provide the output 40 to the consumers that have outstanding debt and/or upcoming bills without sufficient funds in their bank accounts. Thus, it should be appreciated that the central management system 12 may be operated in a way that is beneficial to the merchant, the consumer, and the financial services business.

In some embodiments, the output 40 may enable the consumer to provide an input to carry out the recommended action (e.g., to deposit money into their savings account). For example, the output 40 may include a virtual button (e.g., link) that, upon selection by the consumer, automatically completes the action (e.g., makes a payment to their payment card account) or takes the consumer to a webpage that enables the consumer to carry out the recommended action (e.g., log into their payment card account to make the payment). As noted herein, in some embodiments, the consumer may set preferences related to the output 40. For example, during a registration process, the consumer may provide inputs to the central management system 12 that indicate preferences related to whether they would prefer to divert additional money in cases in which orders cannot be timely fulfilled to their savings account or to pay down debt.

Furthermore, the central management system 12 may monitor a response of the consumer to the output 40 (e.g., effectiveness of the output 40), such as whether the consumer proceeds to complete the order, whether the consumer returns to purchase the good at the later time, and/or whether the consumer proceeds to use the money in the manner recommended by the output 40 (e.g., to transfer the money to their savings account). The central management system 12 may adjust (e.g., modify, update) a future output 40 based on this feedback. For example, if the consumer rejects the notification (e.g., proceeds with the order and/or does not use the money in the manner recommend by the output 40), then the central management system 12 may provide a different type of notification in the next output 40 (e.g., any other type of notification disclosed herein). In some embodiments, the central management system 12 may be configured to provide an additional output to the merchant, such as to notify the merchant that the output 40 was provided to the consumer and/or to notify the merchant of a number of consumers that have received the output 40. The additional output may also include an indication of the effectiveness of the output 40 (e.g., a number of consumers that have delayed their order following the output 40).

The central management system 12 may utilize various algorithms, which may include various machine learning algorithms, to carry out these techniques and to more accurately monitor the ability of the merchant to fulfill orders and/or to provide the output 40 that is appropriate (e.g., personalized and/or effective) for the consumer. As used herein, machine learning refers to algorithms and statistical models that computer systems use to perform a specific task without using explicit instructions, relying instead on patterns and inference. In particular, machine learning generates a mathematical model based on sample data, known as "training data," in order to make predictions or decisions without being explicitly programmed to perform the task.

It should be noted that the processor 30 may be any type of computer processor or microprocessor capable of executing computer-executable code. Further, the processor 30 may be representative of or include multiple processors that are part of the central management system 12 and that may perform processing operations herein described. The memory device 32 and the storage device 34 may be any suitable article of manufacture that can serve to store processor-executable code, data, or the like. These articles of manufacture may represent computer-readable media (e.g., any suitable form of memory or storage) that may store the processor-executable code used by the processor 30 to perform the presently disclosed techniques. The memory device 32 and the storage device 34 may also store data, various software applications, and the like. It should be noted that non-transitory merely indicates that the media is tangible and not a signal. The communication device 36 may facilitate network communications (e.g., wired or wireless) with remote systems and devices, such as other computing systems of the merchant, data services, and the personal device 42.

It should be noted that the components described above with regard to the central management system 12 are exemplary components and these systems of the present disclosure may include additional or fewer components relative to what is shown. Additionally, as would be understood, it should be noted that the personal device 42 may include components similar those described as part of the central management system 12, such as a processor, a communication component, and a memory device. While certain operations are described as being performed by the central management system 12 to facilitate discussion, it should be appreciated that the operations may be divided in any suitable manner between the central management system 12 and any other suitable computing system having one or more processors. For example, the central management system 12 may receive an indication that the merchant is unable to fulfill orders and/or an indication of the severity related to the inability to fulfill orders. Then the central management system 12 may activate or trigger various processes to provide the output 40 in the manner disclosed herein. It should also be noted that aspects of the central management system 12 may include or work in conjunction with a cloud-based computing system, server, or the like. The central management system 12 may include circuitry or software that facilitates association of relevant data (e.g., inventory data 16 and order data 20) for data management purposes.

Figure 2:
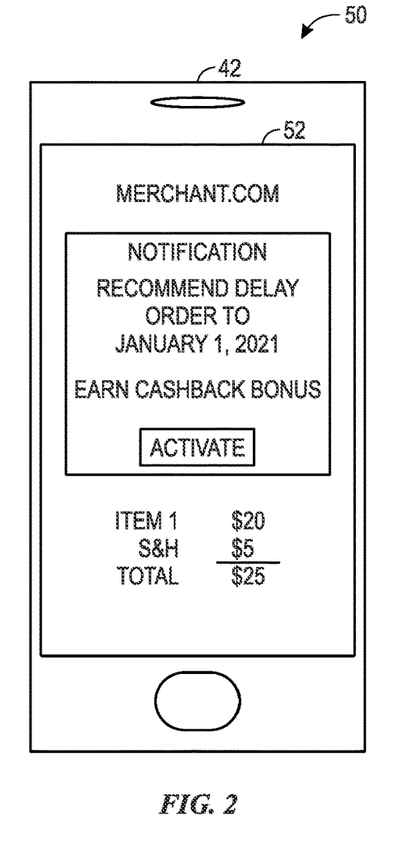
FIG. 2 is a schematic representation of a notification on a graphical user interface that may be presented by the order fulfillment management system of FIG. 1, wherein the notification includes a recommendation to delay an order, in accordance with an embodiment of the present disclosure.

FIGS. 2-5 are schematic representations of various notifications that may be provided to the consumer. In particular, FIG. 2 is a schematic representation of a notification 50 on a graphical user interface (GUI) 52 that may be presented by the payment management system of FIG. 1, in accordance with an embodiment of the present disclosure. The GUI 52 may be displayed by the personal device 42, as shown. The notification 50 may be displayed on a webpage that the consumer may use to purchase the good from the merchant. The notification 50 may include a recommendation to delay the purchase of the good from the merchant, such as a recommendation to delay the purchase of the good from the merchant to a particular date (e.g., calculated by the central management system of FIG. 1 based on the merchant data). In order to discourage the purchase of the good from the merchant, the notification 50 may include a financial incentive, such as an offer for an additional cash back should the consumer elect to delay the purchase of the good from the merchant (e.g., by selecting a virtual button that says "Activate"). The financial incentive may be offered and paid by the merchant and/or by a financial services company that manages the central management system and that works together with the merchant to balance the orders from consumers with the ability of the merchant to fulfill the orders from consumers. As noted above, the financial incentive may be personalized for (e.g., appropriate for; unique to) the consumer based on the consumer data. Furthermore, the financial incentive may be modified over time based on which financial incentives have been previously effective for the consumer and/or based on the degree with which the merchant is unable to fulfill orders. The information included in the notification 50 is merely exemplary, and this information may be omitted and/or presented in a different manner. It should also be appreciated that different and/or additional information may be included in the notification 50.

Figure 3:
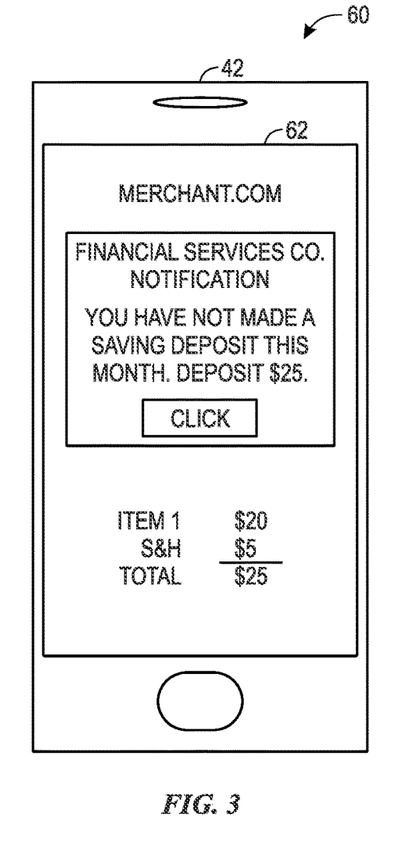
FIG. 3 is a schematic representation of a notification on a graphical user interface that may be presented by the order fulfillment management system of FIG. 1, wherein the notification includes a recommendation to take another action instead of placing an order, in accordance with an embodiment of the present disclosure.

FIG. 3 is a schematic representation of a notification 60 on a GUI 62 that may be presented by the central management system of FIG. 1, in accordance with an embodiment of the present disclosure. The GUI 62 may be displayed by the personal device 42, as shown. The notification 60 may include a pop-up notification that is displayed over a webpage that the consumer may use to purchase the good from the merchant. The notification 60 may include a recommendation to take another action, such as to deposit money into a savings account of the consumer, instead of using the money to buy a good from the merchant. In order to discourage the purchase of the good from the merchant, the notification 60 may provide an explanation of why the recommendation is being made (e.g., the consumer has not deposited money into the savings account this month). In some embodiments, the notification 60 may additionally or alternatively provide other information, such as a balance of the savings account. The notification 60 may enable the consumer to elect to delay the purchase of the good from the merchant and instead follow the recommendation (e.g., by selecting a virtual button that says "Click," which may automatically complete the deposit or take the consumer to a webpage at which the consumer can login and/or complete the deposit).

It should be appreciated that a financial incentive may be offered in addition to the recommendation, such as an offer for an additional amount to be deposited into the savings account should the consumer elect to delay the purchase of the good from the merchant and instead deposit the money into the savings account. The financial incentive may be offered and paid by the merchant and/or by a financial services company that manages the central management system and that works together with the merchant to balance the orders from consumers with the ability of the merchant to fulfill the orders from consumers. As noted above, the notification 60 may be personalized for (e.g., appropriate for; unique to) the consumer based on the consumer data. Furthermore, the notification 60 may be modified over time based on which recommendations have been previously effective for the consumer and/or based on the degree with which the merchant is unable to fulfill orders. The information included in the notification 60 is merely exemplary, and this information may be omitted and/or presented in a different manner. It should also be appreciated that different and/or additional information may be included in the notification 60.

Figure 4:
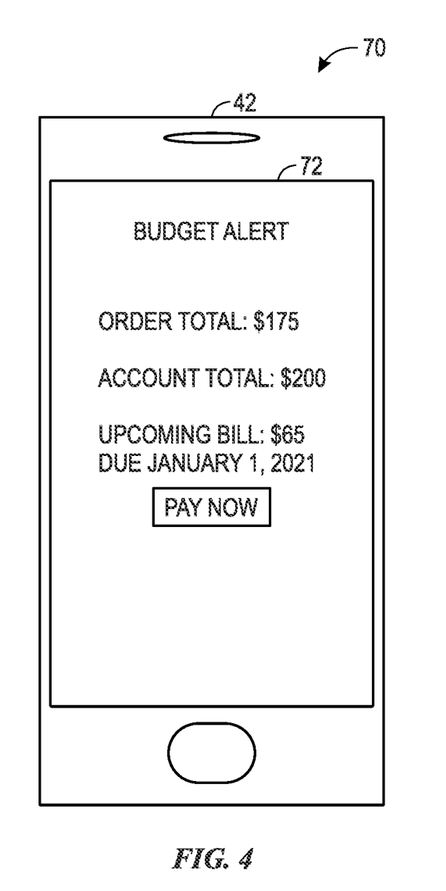
FIG. 4 is a schematic representation of a notification on a graphical user interface that may be presented by the payment management system of FIG. 1, wherein the notification includes a budget alert, in accordance with an embodiment of the present disclosure.

FIG. 4 is a schematic representation of a notification 70 on a GUI 72 that may be presented by the central management system of FIG. 1, in accordance with an embodiment of the present disclosure. The GUI 72 may be displayed by the personal device 42, as shown. The notification 70 may include a budget alert that discourages the order from the merchant, such as by notifying the consumer of an upcoming bill. As shown, the notification 70 may provide additional information, such as a total cost of the order, a total amount of available funds in account(s) of the consumer, and/or an amount and/or a due date of the upcoming bill. The notification 70 may be presented as part of the ordering process, such as on an intermediate webpage that is accessed between the consumer placing goods in their online cart and the consumer completing payment for the goods. In some embodiments, the notification 70 may enable the consumer to elect to delay the purchase of the good from the merchant and instead follow the recommendation (e.g., by selecting a virtual button that says "Pay Now," which may automatically complete the payment of the upcoming bill or take the consumer to a webpage at which the consumer can login and/or complete the payment).

As noted above, the notification 70 may be personalized for (e.g., appropriate for; unique to) the consumer based on the consumer data. Furthermore, the notification 70 may be modified over time based on which recommendations have been previously effective for the consumer and/or based on the degree with which the merchant is unable to fulfill orders. The information included in the notification 70 is merely exemplary, and this information may be omitted and/or presented in a different manner. It should also be appreciated that different and/or additional information may be included in the notification 70.

Figure 5:
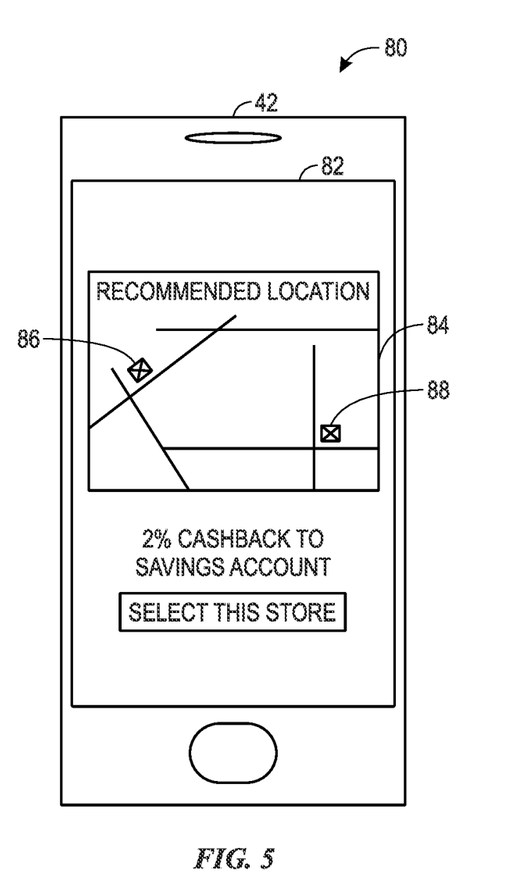
FIG. 5 is a schematic representation of a notification on a graphical user interface that may be presented by the order fulfillment management system of FIG. 1, wherein the notification includes a map and associated guidance, in accordance with an embodiment of the present disclosure.

FIG. 5 is a schematic representation of a notification 80 on a GUI 82 that may be presented by the central management system of FIG. 1, in accordance with an embodiment of the present disclosure. The GUI 82 may be displayed by the personal device 42, as shown. The notification 80 may include a map 84 of a location(s) 86 at which it is recommended that the consumer purchase the good. For example, the map 84 may include the location 86 of a retail store operated by the merchant and that has a highest number of the good in stock within a distance of the consumer (e.g., within a 5, 10, 15, or 20 mile radius of the consumer). The map 84 may include a current location 88 of the consumer, as well as a route from the current location 88 to the location 86.

The notification 80 may include other data related to the map 84, such as an address of the location 86. The notification 80 may also a financial incentive that will be provided to the consumer for purchasing the good from the location 86 (e.g., upon ordering the good for pickup from the location 86). In this way, the consumer may be discouraged from purchasing the good from another location (physical location or an online ordered fulfilled by a warehouse) that has lower inventory and/or is less able (e.g., unable) to fulfill the order in a timely manner, and instead may be encouraged to purchase the good from the location 86 that has higher inventory and is better able to fulfill the order.

The notification 80 may be presented as part of the ordering process, such as on an intermediate webpage that is accessed between the consumer placing goods in their online cart and the consumer completing payment for the goods. In some embodiments, the notification 80 may enable the consumer to elect to delay the purchase of the good from the merchant and instead follow the recommendation (e.g., by selecting a virtual button that says "Select This Store," which may automatically complete the order for pick up at the location 86 or take the consumer to a webpage at which the consumer can login and/or complete order for pick up at the location 86, and which may also automatically initiate steps to provide the financial incentive, such as depositing the cashback into the consumer's account).

As noted above, the notification 80 may be personalized for (e.g., appropriate for; unique to) the consumer based on the consumer data. Furthermore, the notification 80 may be modified over time based on which recommendations have been previously effective for the consumer (e.g., which stores the consumer has visited to pick up orders) and/or based on the degree with which the merchant is unable to fulfill orders. The information included in the notification 80 is merely exemplary, and this information may be omitted and/or presented in a different manner. It should also be appreciated that different and/or additional information may be included in the notification 70.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure. It should be appreciated that any of the features shown and described with respect to FIGS. 1-5 may be combined in any suitable manner. The techniques disclosed herein may also be adapted to manage orders for services provided by the merchant.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. An order fulfillment management system, comprising: processing circuitry configured to:
receive merchant data indicative of a capability of a merchant to fulfill orders for a good;
determine that a first consumer is attempting to complete a purchase of the good via a first webpage that enables the first consumer to add the good to an online cart presented on a graphical user interface of a consumer device, while the merchant data indicates that the merchant is unable to fulfill the orders for the good within a timeframe;
access consumer data related to the first consumer, wherein the consumer data comprises a balance of an account of the first consumer, an upcoming bill for the first consumer, or any combination thereof;
determine a personalized financial incentive to offer to the first consumer in exchange for performing an alternative action instead of the purchase, wherein the personalized financial incentive is personalized for the first consumer based on the balance of the account of the first consumer, the upcoming bill of the first consumer, or any combination thereof, and wherein the personalized financial incentive comprises a personalized amount of additional funds for deposit into the account of the first consumer;
receive an indication that the first consumer accessed the first webpage and added the good to the online cart presented on the graphical user interface of the consumer device;
in response to the indication that the first consumer accessed the first webpage and added the good to the online cart and the determination that the first consumer is attempting to complete the purchase of the good from the merchant using the graphical user interface of the consumer device, while the merchant data indicates that the merchant is unable to fulfill the orders for the good within the timeframe, output, on the graphical user interface of the consumer device, a recommendation of the alternative action to the first consumer, a virtual button that is selectable by the first consumer to complete the alternative action, and the personalized financial incentive that is offered to the first consumer in exchange for completing the alternative action in order to discourage the first consumer from completing the purchase of the good from the merchant; and
automatically deposit the personalized amount of additional funds into the account of the first consumer based on receiving an additional indication that the first consumer selected the virtual button on the graphical user interface of the consumer device.

2. The order fulfillment management system of claim 1, wherein the alternative action comprises making a consumer deposit of monetary funds into the account of the first consumer.

3. The order fulfillment management system of claim 2, wherein the recommendation comprises a link that, upon selection by the first consumer, automatically initiates the consumer deposit of the monetary funds into the account of the first consumer.

4. The order fulfillment management system of claim 2, wherein the recommendation comprises a current balance of the account of the first consumer.

5. The order fulfillment management system of claim 1, wherein the alternative action comprises delaying the purchase of the good from the merchant.

6. The order fulfillment management system of claim 1, wherein the alternative action comprises paying the upcoming bill of the first consumer.

7. The order fulfillment management system of claim 6, wherein the recommendation comprises a current balance of the upcoming bill and a due date of the upcoming bill.

8. The order fulfillment management system of claim 1, wherein the alternative action comprises establishing periodic payments from the account or a payment account controlled by the first consumer, and the periodic payments allow for a completed purchase and delivery of the good at a time beyond the timeframe.

9. The order fulfillment management system of claim 1, wherein the merchant data that indicates the merchant is unable to fulfill the orders for the good comprises merchant data indicating an inventory below a threshold inventory amount.

10. The order fulfillment management system of claim 1, wherein the processing circuitry is configured to:
output, on the graphical user interface of the consumer device, an additional recommendation to the first consumer in response to the first consumer attempting to complete another purchase of the good from the merchant while the merchant data indicates that the merchant is able to fulfill the orders for the good;
wherein the additional recommendation is configured to encourage the first consumer to complete the purchase of the good from the merchant by providing a status of the account of the first consumer.

11. The order fulfillment management system of claim 1, wherein the processing circuitry is configured to:
output an additional recommendation to a second consumer in response to the second consumer attempting to complete a respective purchase of the good from the merchant while the merchant data indicates that the merchant is unable to fulfill the orders for the good within the timeframe, wherein the recommendation and the additional recommendation are different from one another, and the processing circuitry is configured to generate the recommendation and the additional recommendation based on respective consumer data for the first consumer and the second consumer.

12. The order fulfillment management system of claim 1, wherein the processing circuitry is configured to determine the personalized financial incentive based on previous responses of the first consumer to previously offered personalized financial incentives.

13. An order fulfillment management system, comprising: processing circuitry configured to:
receive merchant data indicative of a capability of a merchant to fulfill orders for a good;
determine that a consumer is attempting to complete a purchase of the good via a first webpage that enables the consumer to add the good to an online cart present on a graphical user interface of a consumer device, while the merchant data indicates that the merchant is unable to fulfill the orders for the good within a timeframe;
receive consumer data related to the consumer, wherein the consumer data comprises a balance of an account of the consumer, an upcoming bill for the consumer, or any combination thereof;
determine a personalized financial incentive to offer to the consumer in exchange for performing an alternative action instead of the purchase, wherein the personalized financial incentive is personalized for the consumer based on the balance of the account of the consumer, the upcoming bill for the consumer, or any combination thereof, and wherein the personalized financial incentive comprises a deposit of additional funds into the account of the consumer;
receive an indication that the consumer accessed the first webpage and added the good to the online cart presented on the graphical user interface of the consumer device;
in response to the indication that the consumer accessed the first webpage and added the good to the online cart and the determination that the consumer is attempting to complete the purchase of the good from the merchant using the graphical user interface of the consumer device, while the merchant data indicates that the merchant is unable to fulfill the order for the good within the timeframe, output, on the graphical user interface of the consumer device, a recommendation of the alternative action to the consumer, a virtual button that is selectable by the consumer to complete the alternative action, and the personalized financial incentive that is offered to the consumer in exchange for completing the alternative action in order to discourage the consumer from completing the purchase of the good from the merchant; and
automatically deposit the personalized amount of additional funds into the account of the consumer based on receiving an additional indication that the consumer selected the virtual button on the graphical user interface of the consumer device.

14. The order fulfillment management system of claim 13, wherein the processing circuitry is configured to receive a respective priority level of the consumer and to select the alternative action based on the respective priority level.

15. The order fulfillment management system of claim 13, wherein the consumer data additionally comprises a response of the consumer to a prior personalized notification that was configured to discourage the consumer from completing a respective purchase of another good.

16. The order fulfillment management system of claim 13, wherein the processing circuitry is configured to utilize a machine learning algorithm to determine the personalized financial incentive.

17. A method of operating an order fulfillment management system, the method comprising:
receiving, at processing circuitry, merchant data that indicates that a merchant is unable to fulfill orders for a good within a timeframe;

receiving, at the processing circuitry, consumer data related to a consumer, wherein the consumer data comprises a balance of an account of the consumer, an upcoming bill for the consumer, or any combination thereof;

receiving, at the processing circuitry, a request from the consumer to complete a purchase of the good from the merchant via a first webpage that enables the consumer to add the good to an online cart presented on a graphical user interface of a consumer device, while the merchant data indicates that the merchant is unable to fulfill the orders for the good within the timeframe;

determining, using the processing circuitry, a recommended action for the consumer, wherein the recommended action is an alternative to the purchase of the good from the merchant and is personalized for the consumer based on the consumer data;

determining, using the processing circuitry, a personalized financial incentive that is offered to the consumer in exchange for performing the recommended action, wherein the personalized financial incentive is personalized for the consumer based on the balance of the account of the consumer, the upcoming bill for the consumer, or any combination thereof, and the personalized financial incentive comprises a deposit of additional funds into the account of the consumer;

receive an indication that the consumer accessed the first webpage and added the good to the online cart presented on the graphical user interface of the consumer device;

in response to the indication that the consumer accessed the first webpage and added the good to the online cart and the determination that the consumer is attempting to complete the purchase of the good from the merchant using the graphical user interface of the consumer device, while the merchant data indicates that the merchant is unable to fulfill orders for the good within the timeframe, outputting, using the processing circuitry and on the graphical user interface of the consumer device, the recommended action to the consumer, a virtual button that is selectable by the consumer to complete the recommended action, and the personalized financial incentive that is offered to the consumer in exchange for completing the recommended action in order to discourage the consumer from completing the purchase of the good from the merchant; and automatically depositing, using the processing circuitry, the personalized amount of additional funds into the account of the consumer based on receiving an additional indication that the consumer selected the virtual button on the graphical user interface of the consumer device.

18. The method of claim 17, comprising:

determining, using the processing circuitry, a severity level at which the merchant is unable to fulfill the orders for the good within the timeframe; and determining, using the processing circuitry, the personalized financial incentive that is appropriate for the consumer based on the severity level.

* * * * *